United States Patent
Matsudaira et al.

(10) Patent No.: US 8,923,379 B2
(45) Date of Patent: Dec. 30, 2014

(54) TRANSMISSION APPARATUS AND COMMUNICATION SYSTEM

(71) Applicant: Renesas Electronics Corporation, Kawasaki (JP)

(72) Inventors: Masaharu Matsudaira, Kawasaki (JP); Koichi Yamaguchi, Kawasaki (JP); Kenichiro Hijioka, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 13/968,869

(22) Filed: Aug. 16, 2013

(65) Prior Publication Data

US 2014/0072025 A1    Mar. 13, 2014

(30) Foreign Application Priority Data

Sep. 7, 2012    (JP) ................................. 2012-197769

(51) Int. Cl.
*H04L 27/01*    (2006.01)

(52) U.S. Cl.
CPC ...................................... *H04L 27/01* (2013.01)
USPC ........................................................ 375/232

(58) Field of Classification Search
USPC ......... 375/295, 296, 297, 259, 285, 229, 230, 375/232; 455/114.2, 114.3
See application file for complete search history.

(56) References Cited

U.S. PATENT DOCUMENTS

| | | | | |
|---|---|---|---|---|
| 4,953,026 A | * | 8/1990 | Kobayashi et al. | 348/614 |
| 6,085,104 A | * | 7/2000 | Kowalski et al. | 455/506 |
| 2008/0130789 A1 | * | 6/2008 | Copeland et al. | 375/297 |
| 2011/0319046 A1 | * | 12/2011 | Lackey | 455/307 |

FOREIGN PATENT DOCUMENTS

JP    2010-147557 A    7/2010

OTHER PUBLICATIONS

N. Miura et al., "Analysis and Design of Inductive Coupling and Transceiver Circuit for Inductive Inter-Chip Wireless Superconnect", IEEE Journal of Solid-State Circuits, vol. 40, No. 4, Apr. 2005, pp. 829-837.
Jared L. Zerbe et al., "Equalization and Clock Recovery for a 2.5-10-Gb/s 2-PAM/4-PAM Backplane Transceiver Cell", IEEE Journal of Solid-State Circuits, vol. 38, No. 12, Dec. 2003, pp. 2121-2130.
James F. Buckwalter et al., "Phase and Amplitude Pre-Emphasis Techniques for Low-Power Serial Links", IEEE Journal of Solid-State Circuits, vol. 41, No. 6, Jun. 2006, pp. 1391-1399.

* cited by examiner

*Primary Examiner* — Siu Lee
(74) *Attorney, Agent, or Firm* — McGinn IP Law Group, PLLC

(57) ABSTRACT

A transmission apparatus includes a transmission equalizer that equalizes a transmission signal transmitted in a signal transmission performed via a non-contact coupling including a magnetic coupling of a pair of coupling elements. The transmission equalizer creates plural equivalent transmission signals by branching the transmission signal; and includes plural signal paths that respectively give time delays different from each other to the equivalent transmission signals, and respectively multiplies the delayed transmission signals by tap coefficients. In addition, at least one pair of signal paths is set includes a variable delay circuit that can change the corresponding time delay to be given to the corresponding transmission signal.

20 Claims, 15 Drawing Sheets

CONTROL SIGNAL

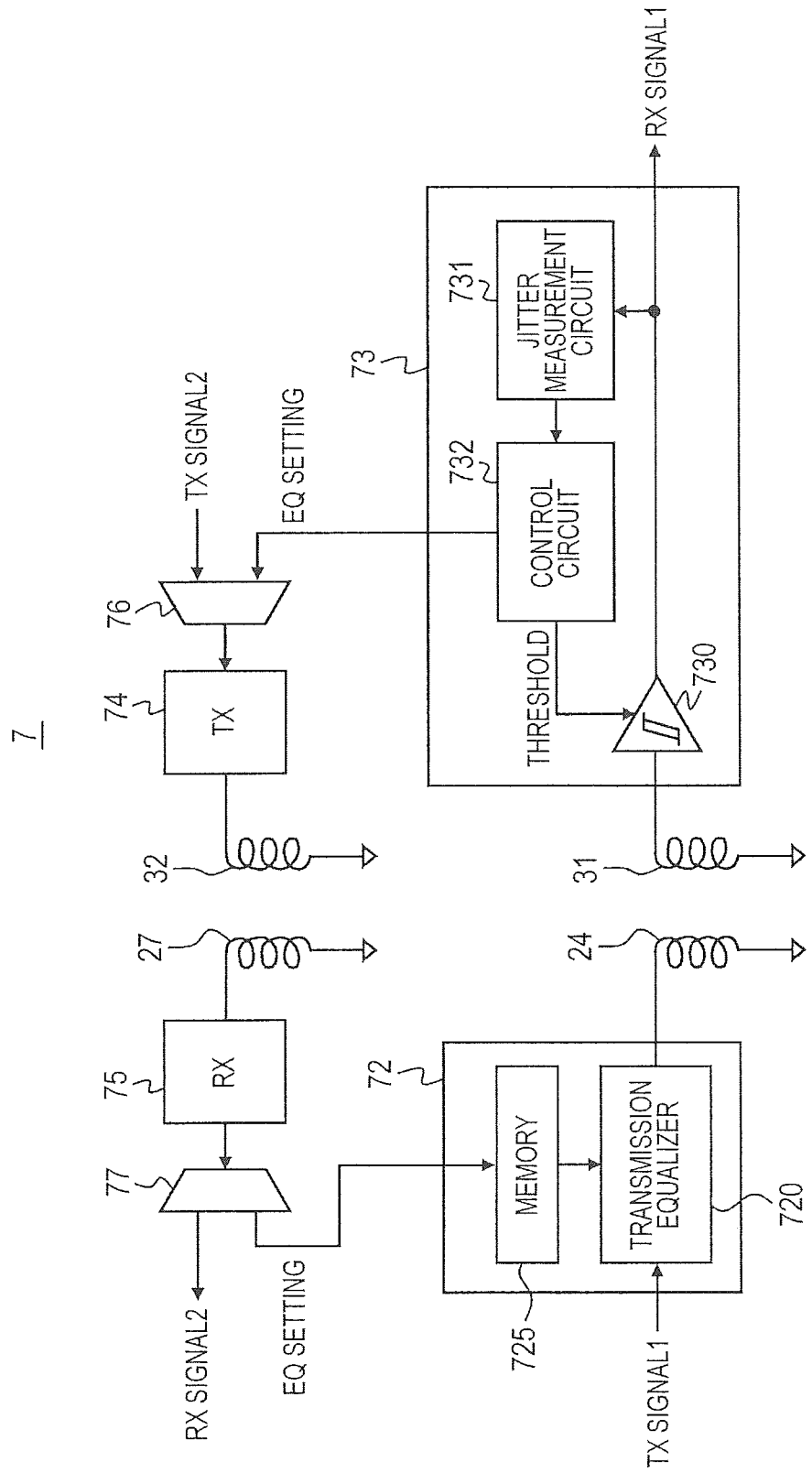

TRANSMISSION APPARATUS AND COMMUNICATION SYSTEM

CROSS-REFERENCE TO RELATED APPLICATIONS

The disclosure of Japanese Patent Application No. 2012-197769 filed on Sep. 7, 2012 including the specification, drawings and abstract is incorporated herein by reference in its entirety.

BACKGROUND

The present invention relates to transmission apparatuses and communication systems, and can be favorably applied to, for example, a near-field wireless communication.

A near-field wireless communication technology using the non-contact coupling of a pair of coupling elements is well-known. The non-contact coupling of the pair of coupling elements includes a magnetic coupling (inductive coupling) or an electrical coupling (capacitive coupling). The near-field wireless communication technology using the non-contact coupling have an advantage in that a high data rate can be implemented in an ultra-short distance (for example, several tens of micrometers to several centimeters) communication. Nonpatent Literature 1 (N. Miura et al., "Analysis and Design of Inductive Coupling and Transceiver Circuit for Inductive Inter-Chip Wireless Superconnect", IEEE JOURNAL OF SOLID-STATE CIRCUITS, VOL. 40, NO. 4, April 2005, pp. 829-837) discloses a communication system in which a baseband signal transmission using a transmission line including a magnetic coupling of a pair of inductors (referred to a magnetic coupling transmission line hereinafter) is performed. In addition, Nonpatent Literature 1 discloses a theoretical analysis using an equivalent model of a magnetic coupling and also discloses that the gain of a magnetic coupling transmission line (voltage transfer function S21) shows a high-pass filter characteristic. FIG. 1 shows the frequency characteristic of the gain of the magnetic coupling transmission line disclosed in Nonpatent Literature 1.

Nonpatent Literature 2 (Jared L. Zerbe et al., "Equalization and Clock Recovery for a 2.5-10-Gb/s 2-PAM/4-PAM Backplane Transceiver Cell", IEEE JOURNAL OF SOLID-STATE CIRCUITS, VOL. 38, NO. 12, December 2003, pp. 2121-2130) and Nonpatent Literature 3 (James F. Buckwalter et al., "Phase and Amplitude Pre-Emphasis Techniques for Low-Power Serial Links", IEEE JOURNAL OF SOLID-STATE CIRCUITS, VOL. 41, NO. 6, June 2006, pp. 1391-1399) disclose pre-emphasis technologies that are applied to PAM (Pulse Amplitude Modulation) transmissions performed via wire transmission lines. To put it concretely, Nonpatent Literatures 2 and 3 disclose FIR (Finite Impulse Response) filter-type pre-emphasis circuits (that is, transmission equalizers) disposed in transmitters. For example, Nonpatent Literature 3 discloses that a symbol-spaced FIR filter or a half-symbol-spaced FIR filter is used as a transmission equalizer for correcting an ISI (Inter Symbol Interference) and a DDJ (Data-Dependent Jitter).

SUMMARY

As shown in Nonpatent Literature 1, the signal transmission characteristic of a wireless transmission line including a non-contact coupling (referred to as a non-contact coupling transmission line hereinafter) is different from that of a wire transmission line. To put it concretely, because the wire transmission line shows a low-pass filter characteristic, it is fundamentally unnecessary to take the effect of a high frequency distortion of a received waveform in a baseband transmission performed via the wire transmission line into consideration. On the other hand, as shown in Nonpatent Literature 1, the non-contact coupling transmission line shows the high-pass filter characteristic. Therefore, it is necessary to take the effect of a high frequency distortion of a received waveform in a baseband transmission performed via a non-contact coupling into consideration.

In addition, after examining the gains (voltage transfer functions S21) of non-contact coupling transmission lines including plural pairs of coupling elements having various shapes and designs, the inventors of the present invention have found out the fact that the frequency characteristics of the gains do not show smooth curves like the curve shown in FIG. 1, but show curves respectively having conspicuous peaks in high frequency bands. These peaks cause high frequency distortions to be generated in the waveforms of signals received via the non-contact couplings.

In addition, in the case of a wire transmission line having a low-pass filter characteristic, as disclosed in Nonpatent Literatures 2 and 3, if a transmission equalizer is configured as a symbol-spaced FIR filter or a half-symbol-spaced FIR filters, the transmission equalizer works well. To put it concretely, in the case of the wire transmission line, it is good enough if the minimum relative time delay (difference between time delays) is set to a symbol time or a half of a symbol time. In addition, in the case of the wire baseband transmission using a line code such as the NRZ (Non Return Zero) code, the RZ (Return Zero) code, the Biphase code, or the like, because one symbol is transmitted by one bit, it is good enough if the minimum relative time delay between the taps is set to one bit time (i.e., 1/Rb), or a half of a bit time (i.e., ½Rb), where Rb is a bit rate of the baseband signal.

However, the FIR filter, in which relative time delays between the taps are set to one symbol times or to halves of a symbol time, does not work well for correcting the distortion of a reception signal caused by a high frequency peak that appears in a gain of a non-contact coupling transmission line. There are many cases where a peak frequency that appears in the voltage transfer function of the non-contact coupling is higher than the symbol rate of the transmission signal (the symbol rate is equal to the bit rate in the case of a baseband transmission). It is difficult for an FIR filter in which relative time delays between taps are set to one symbol times or halves of a symbol time to correct a high frequency distortion which frequency is higher than the symbol rate (the symbol rate is equal to the bit rate in the case of a baseband transmission).

In other words, the inventors of the present invention have found out a problem in that it is necessary to devise a method to correct the distortion of a reception signal caused by the high frequency peak that appears in the gain of a non-contact coupling transmission line including a magnetic coupling using a transmission equalizer. In addition, the inventors of the present invention have found out various problems about the speeding up of a wireless communication performed via a non-contact coupling transmission line. These problems and several illustrative embodiments of technological ideas that are devised by the inventors of the present invention for solving these problems will be manifested by the descriptions about later-mentioned embodiments and the accompanying drawings.

According to an aspect of the present invention, a transmission apparatus includes a transmission equalizer that equalizes a transmission signal transmitted in a signal transmission performed via a non-contact coupling including a magnetic coupling of a pair of coupling elements. Here, the transmission equalizer creates plural equivalent transmission signals by branching the transmission signal. In addition, the transmission equalizer includes plural signal paths that respectively give time delays different from each other to the equivalent transmission signals, and respectively multiplies the delayed transmission signals by tap coefficients. In addition, at least one of the signal paths includes a variable delay circuit that can change the corresponding time delay to be given to the corresponding transmission signal.

According to another aspect of the present invention, a transmission apparatus includes a transmission equalizer that equalizes a transmission signal transmitted in a signal transmission performed via a non-contact coupling including a magnetic coupling of a pair of coupling elements. Here, the transmission equalizer creates plural equivalent transmission signals by branching the transmission signal. In addition, the transmission equalizer includes plural signal paths that respectively give time delays different from each other to the equivalent transmission signals, and respectively multiplies the delayed transmission signals by tap coefficients. In addition, the relative time delay between at least one pair of signal paths is set to a time interval shorter than a half of a symbol time of the transmission signal.

According to another aspect of the present invention, a transmission apparatus includes a transmission equalizer that equalizes a transmission signal transmitted in a signal transmission performed via a non-contact coupling including a magnetic coupling of a pair of coupling elements. Here, the transmission equalizer creates plural equivalent transmission signals by branching the transmission signal. In addition, the transmission equalizer includes plural signal paths that respectively give time delays different from each other to the equivalent transmission signals, and respectively multiplies the delayed transmission signals by tap coefficients. In addition, the relative time delay between at least one pair of signal paths is set to the reciprocal number of twice the peak frequency that appears in the voltage transfer function of the non-contact coupling.

According to each of the above-described aspects of the present invention, it becomes possible to correct the distortion of a reception signal caused by a high frequency peak that appears in the gain of a non-contact coupling transmission line including a magnetic coupling using a transmission equalizer.

BRIEF DESCRIPTION OF THE DRAWINGS

FIG. 14 is a diagram showing a configuration example of a communication system according to a fifth embodiment of the present invention;

DESCRIPTION

Figure 1:
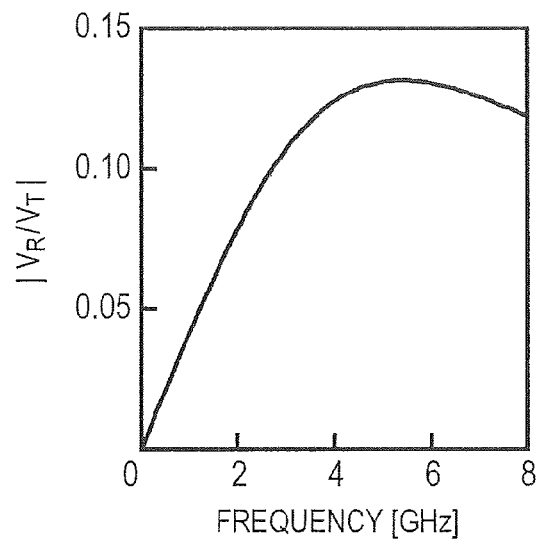
FIG. 1 is a graph showing the frequency characteristic of the voltage transfer function (gain) of a magnetic coupling transmission line disclosed in a related technology.

Hereinafter, concrete embodiments of the present invention will be described in detail with reference to the accompanying drawings. In the drawing, components that are the same as or equivalent to each other will be given identical reference numerals, and redundant explanations about these components will be avoided for clarification of explanation.

First Embodiment

Figure 2:
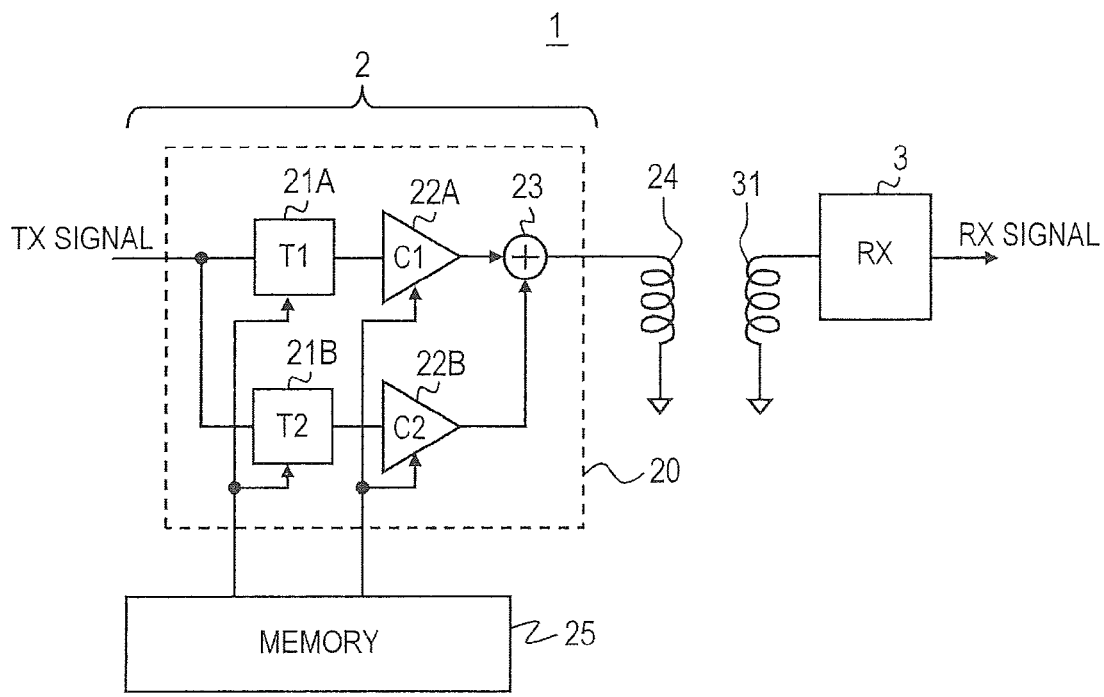
FIG. 2 is a diagram showing a configuration example of a communication system according to a first embodiment of the present invention.

FIG. 2 shows a configuration example of a wireless communication system 1 according to a first embodiment of the present invention. The wireless communication system 1 includes a transmission circuit (TX) 2 and a reception circuit (RX) 3. The transmission circuit 2 transmits a signal to the reception circuit 3 via a non-contact coupling transmission line formed between coupling elements 24 and 31. The non-contact coupling between the coupling elements 24 and 31 includes at least one magnetic coupling (inductive coupling). The non-contact coupling between the coupling elements 24 and 31 can includes both magnetic coupling and electric coupling (capacitive coupling). The coupling elements 24 and 31 can be also referred to as couplers or antennas. It is conceivable that each of the coupling elements 24 and 31 can be an inductor, and more concretely a coil.

The transmission signal (TX SIGNAL) of the transmission circuit 2 is, for example, a baseband signal. It is conceivable that the line coding applied to the baseband signal is, for example, the NRZ coding, the RZ coding, the Bipolar (AMI (Alternative Mark Inversion)) NRZ coding, the Bipolar RZ coding, or the Biphase coding. In addition, it is conceivable that because, in a signal transmission performed via a magnetic coupling, a current variation on the transmission side has an influence on the signal transmission, the transmission circuit 2 generates a differential voltage signal (for example, a bipolar pulse signal, or a Manchester code signal) as a transmission signal in order to obtain a desired current pulse waveform (for example, a Gaussian pulse).

As mentioned above, the inventors of the present invention have found out the fact that the frequency characteristic of the voltage transmission function (gain) of a non-contact coupling transmission line shows a curve having a high frequency peak. Therefore, in the case where a data communication is performed via the non-contact coupling of the pair of the coupling elements 24 and 31, a reception signal (RX SIGNAL) received by the reception circuit 3 includes a waveform distortion (for example, a ringing) caused by the high frequency peak. The transmission circuit 2 shown in FIG. 2 includes a transmission equalizer 20 for correcting this high frequency waveform distortion. The transmission equalizer 20 is configured to equalize a transmission signal transmitted in a signal transmission via a non-contact coupling including a magnetic coupling of the pair of the coupling elements 24 and 31.

The transmission equalizer 20 can be also configured with an FIR filter as shown in FIG. 2. The transmission equalizer 20 shown in FIG. 20 creates two equivalent transmission signals by branching the transmission signal. In addition, the transmission equalizer 20 includes two signal paths. The two signal paths respectively give two time delays different from each other to the two equivalent transmission signals, and respectively multiply the delayed transmission signals with two tap coefficients. To put it concretely, a first signal path includes a variable delay circuit 21A and an amplifier (tap coefficient multiplier) 22A. The variable delay circuit 21A gives a time delay T1 to the first transmission signal. The amplifier 22A multiplies the delayed first transmission signal with a tap coefficient C1. In a similar way, a second signal path includes a variable delay circuit 212 that gives a time delay T2 to the second transmission signal and an amplifier 222 that multiplies the delayed second transmission signal with a tap coefficient C2.

In addition, the transmission equalizer 20 includes an output path that provides a filter output based on the total sum of outputs of plural signal paths (in the example shown in FIG. 2, the number of the signal paths is 2) to the coupling element 24 on the transmission side. In the example of FIG. 2, the output path of the transmission equalizer 20 includes an adder 23. The adder 23 receives the outputs of the amplifiers 22A and 22B, adds these outputs, supplies a signal obtained by this addition to the coupling element 24.

In the example shown in FIG. 2, the transmission equalizer 20 is configured so that the time delays T1 and T2 and the tap coefficients C1 and C2 can be changed. A memory 25 supplies control signals (for example, setting values) used for setting the values of the time delays T1 and T2, and the values of the tap coefficients C1 and C2 to the variable delay circuits 21A and 21B, and to the amplifiers 22A and 22B. Either a non-volatile storage device or a volatile storage device can be used for the memory 25. In addition, the memory can be either a rewritable storage device or a non-rewritable storage device. It is conceivable that the memory 25 is, for example, a fuse ROM (Read Only Memory), an EPROM (Erasable Programmable ROM), a flash memory, a hard disk drive, a DRAM (Dynamic Random Access Memory), or a register.

In the example of FIG. 2, the transmission equalizer 20 is configured so that each time delay given to the corresponding transmission signal in the corresponding signal path can be changed. However, it is also all right if the transmission equalizer 20 is configured so that time delays given to transmission signals in some of the plural signal paths can be changed, and time delays given to transmission signals in the other signal paths are set to fixed values by fixed delay circuits. In addition, it is good enough if one of the plural signal paths includes no delay circuit, and gives a zero time delay to the corresponding transmission signal. In any of the above-mentioned configurations of the transmission equalizer 20, the relative time delay Td between at least one pair of signal paths (in other words, the relative time delay Td between at least one pair of taps) can be accordingly changed.

In addition, in the example of FIG. 2, the transmission equalizer 20 is configured so that the tap coefficients C1 and C2 by which the transmission signals are multiplied by the amplifiers 22A and 22B respectively can be changed. However, it is also all right if the transmission equalizer 20 is configured so that tap coefficients, by which transmission signals in some of the plural signal paths are multiplied, can be changed, and tap coefficients, by which transmission signals in the other signal paths are multiplied, are set to fixed values. Here, the fixed values of tap coefficients can be 1, and amplifiers 22 in signal paths with their tap coefficients 1 can be omitted.

As described above, in the case of a transmission equalizer (that is, a pre-emphasis FIR filter) for the related wire transmission, it is good enough if relative time delays between taps are fixedly set to one symbol times or to halves of a symbol time. However, such a configuration of transmission equalizer for the related wire transmission does not work well for a wireless transmission performed via a non-contact coupling including a magnetic coupling. On the other hand, the transmission equalizer 20 according to an aspect of the present invention is configured so that relative time delays Td between taps can be changed. Therefore, the transmission equalizer 20 can determine a relative time delay between taps in accordance with each of various peak frequencies that appear in the voltage transfer function of the non-contact coupling between the pair of the coupling elements 24 and 31. The above function of the transmission equalizer 20 makes it possible that the distortion of the received waveform caused by each of the high frequency peaks that appear in the voltage transfer function is corrected, which will be described in detail hereinafter.

In one concrete example of the present invention, the relative time delay Td (Td=|T2−T1|) between the two signal paths (that is, between the variable delay circuits 21A and 21B) can be set to a time interval shorter than a half of a symbol time of the transmission signal. This setting of the relative time delay Td makes it possible that the distortion of the received waveform including frequency components, which frequencies are higher than the symbol rate of the transmission signal, is corrected by the transmission equalizer 20. In addition, as described above, in the case where one bit is transmitted by one symbol of a transmission signal waveform, one symbol time is equal to one bit time. A transmission method in which one bit is transmitted by one symbol is, for example, a baseband transmission using the NRZ code, the RZ code, the Manchester code, or the like.

In addition, in another concrete example of the present invention, the relative time delay Td between the two signal paths can be set to a time interval that is shorter than one symbol time of the transmission signal and not equal to one nth of the one symbol time (wherein n is a positive integer). Such a configuration/setting of the transmission equalizer 20 also makes it possible that the distortion of the received waveform caused by a peak that appears in the voltage transfer function of the non-contact coupling of the pair of the coupling elements 24 and 31 is appropriately corrected while the above distortion of the received waveform can not be corrected by the related equalizer in which a relative time delay Td is fixedly set to a half of a symbol time.

In addition, in another concrete example of the present invention, the relative time delay Td between the two signal paths in the transmission equalizer 20 can be also determined on the basis of a high frequency peak that appears in the voltage transfer function (gain) of the non-contact coupling. For example, the relative time delay Td can be set to the reciprocal number of twice the peak frequency that appears in the voltage transfer function of the non-contact coupling of the pair of the coupling elements 24 and 31. In other words, an oversampling which frequency is twice the frequency of a high frequency peak that appears in the voltage transfer function can be also performed in the transmission equalizer 20. This oversampling performed in the transmission equalizer makes it possible that the distortion of the received waveform caused by the high frequency peak that appears in the voltage transfer function is corrected.

Figure 3:
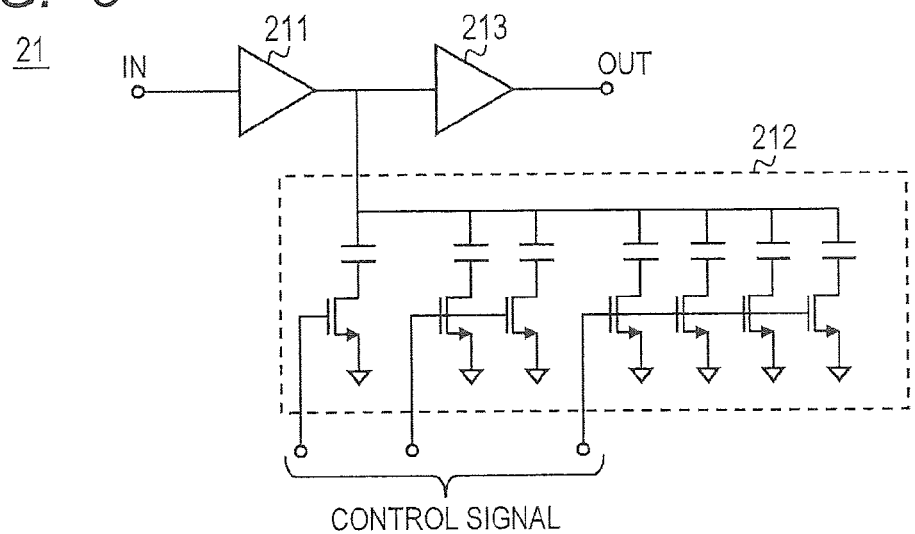
FIG. 3 is a diagram showing a configuration example of a variable delay circuit according to the first embodiment of the present invention.

Next, the configuration examples of the variable delay circuits 21A and 21B will be described below. Under the assumption that the configurations of the variable delay circuits 21A and 21B are the same as each other, a variable delay circuit 21 shown in FIG. 3 will be described on behalf of the variable delay circuits 21A and 21B. FIG. 3 is a diagram showing the configuration example of the variable delay circuit 21. The variable delay circuit 21 shown in FIG. 3 includes two amplifiers 211 and 213 coupled in series, and a variable capacitor circuit 212 that shunt-couples the output of the amplifier 211 to the ground potential. The variable capacitor circuit 212 includes plural capacitors and plural switch transistors. One terminal of each capacitor is coupled to the output of the amplifier 211, and the other terminal is coupled to the ground potential via the corresponding switch transistor. The switch transistors operates in accordance with control signals (that is, setting signals for setting time delays) supplied by the memory 25. The output of the amplifier 211 is delayed in accordance with the magnitude of the load capacity (the capacity of the variable capacitor circuit 212) of the amplifier 211. The amplifier 213 is provided for compensating for the attenuation of a transmission signal caused by the load capacity (the capacity of the variable capacitor circuit 212).

Here, the configurations of the variable delay circuits 21A and 21B can be different from each other. For example, in the configuration example shown in FIG. 3, the capacity variable range of the variable delay circuit 21B can be different from that of the variable delay circuit 21A. In addition, it goes without saying that the configuration example shown in FIG. 3 is only an example. For example, the variable delay circuits 21A and 21B can be configured with track and hold circuits. By making the phases of clock signals supplied to respective track and hold circuits different from each other, it becomes possible that the delay given by the variable delay circuit 21A to a transmission signal corresponding to the variable delay circuit 21A differs from the delay given by the variable delay circuit 21B to a transmission signal corresponding to the variable delay circuit 21B.

Figure 4A:
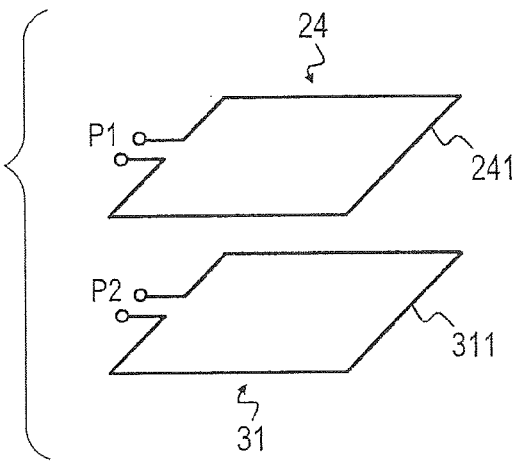
FIG. 4A and FIG. 4B are diagrams showing configuration examples of pairs of coupling elements according to the first embodiment of the present invention.
Figure 4B:
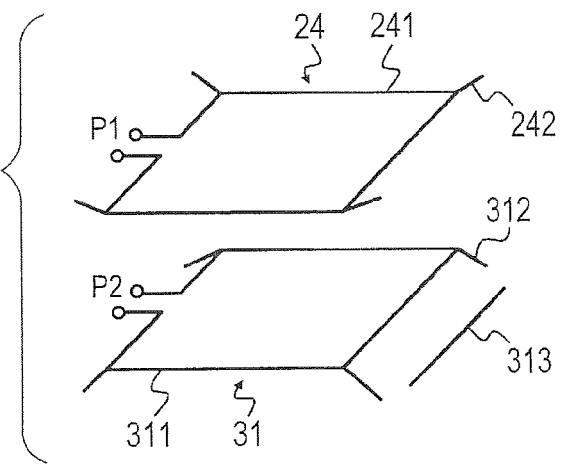

Subsequently, a configuration example of the coupling elements 24 and 31, and a concrete example of the voltage transfer function (gain) of the non-contact coupling of the pair of the coupling elements 24 and 31 will be described. In addition, the distortion of the received waveform caused by the high frequency peak that appears in the voltage transfer function of the non-contact coupling, and the operation of the transmission equalizer 20 for correcting the distortion of the received waveform will be described. As two examples of the pair of the coupling elements 24 and 34, one is shown in FIG. 4A, and the other is shown in FIG. 4B. Each pair of the coupling elements 24 and 31 shown in FIG. 4A and in FIG. 4B can be inductors having conductive loops 241 and 311, and these conductive loops are disposed to face each other. Each of the coupling elements 24 and 31 shown in FIG. 4A or in FIG. 4B can be considered as a coil with its winding number 1. When the coupling element 24 is driven by the transmission signal (that is, by the equalized signal), a current that varies in time in accordance with the transmission signal flows through the coupling element 24, and a magnetic field that varies in time is generated around the periphery of the coupling element 24. As a result, because the other coupling element 31 is disposed in this time-varying magnetic field, an induced electromotive force that reflects the transmission signal is generated in the coupling element 31. As described above, a differential mode signal is transmitted from the transmission circuit 2 to the reception circuit 3. Such a face-to-face disposition of the two conductive loops 241 and 311 as shown in FIG. 4A or in FIG. 4B makes it possible that the gain of the transmission signal transferred from the coupling element 24 to the coupling element 31 is improved because the magnetic field (magnetic flux) generated by the current flowing through the coupling element 24 effectively passes through the conductive loop 311 of the coupling element 31.

To describe it in more detail, in the example shown in FIG. 4A or in FIG. 4B, each of the conductive loops 241 and 311 has a line-symmetric shape. This line-symmetric shape contributes to the improvement of transmission quality. In other words, adapting the symmetric shapes of the conductive loops 241 and 311 can improve the symmetry of the transmission signal. Therefore, even in the case where a communication is performed in a high data rate, an accurate data transmission can be achieved.

In the example shown in FIG. 4B, the coupling elements 24 and 31 include fixing pins 242 and fixing pins 312 respectively. In addition, the coupling element 31 includes a floating pin 313. The floating pin 313 is a pin that is electrically floating, and is coupled neither to the conductive loop 311 nor to the ground potential.

Figure 5A:
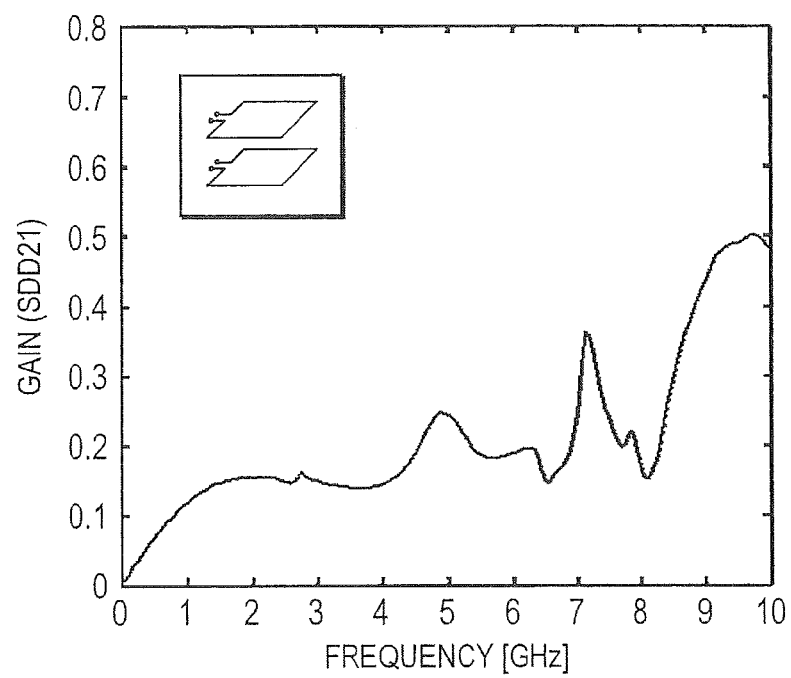
FIG. 5A and FIG. 5B are respectively graphs showing the frequency characteristic and the step response of the voltage transfer function (gain) of the pair of the coupling elements shown in FIG. 4A.
Figure 5B:
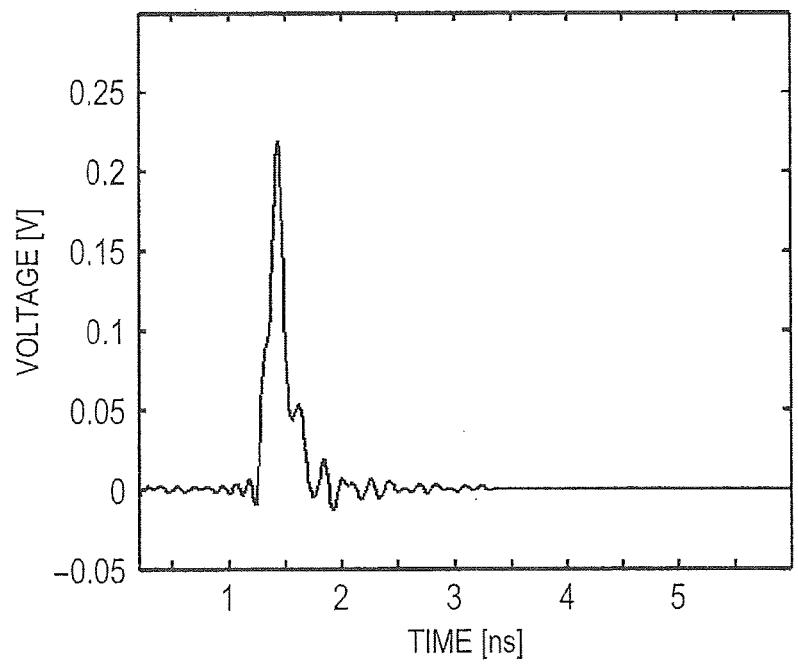

FIG. 5A is a graph showing a simulation result of the gain of the transmission signal transferred from the coupling element 24 to the coupling element 31 (that is, the transfer function Sdd21 from a port P1 to a port P2) shown in FIG. 4A. In addition, FIG. 5B is a graph showing a simulation result of the output of the coupling element 31 when a step voltage is applied to the coupling element 24 shown in FIG. 4A (that is, a step response). In a similar way to above, FIG. 6A is a graph showing a simulation result of the transfer function Sdd21 of a pair of the coupling elements 24 and 31 shown in FIG. 4B, and FIG. 6B is a graph showing a simulation result of a step response of the pair of the coupling elements 24 and 31 shown in FIG. 4B.

Figure 6A:
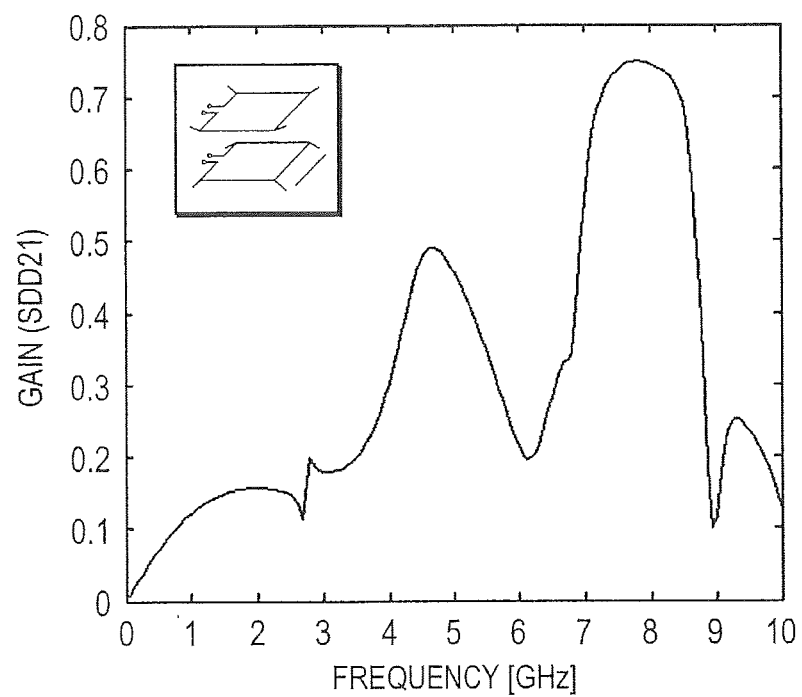
FIG. 6A and FIG. 6B are respectively graphs showing the frequency characteristic and the step response of the voltage transfer function (gain) of the pair of the coupling elements shown in FIG. 4B.
Figure 6B:
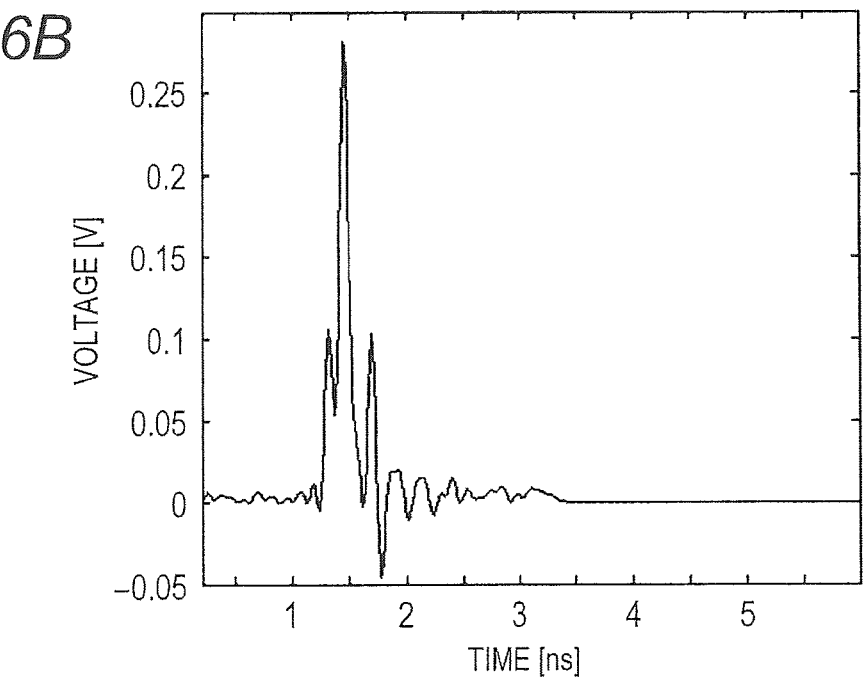

As can be understood from FIG. 5A and FIG. 6A, the gain of the pair of the coupling elements 214 and 31 shown in FIG.

5A or in FIG. 6A is not so smooth as the curve shown in FIG. 1, and the gain has peaks in a high frequency band. The example of the gain shown in FIG. 5A has peaks around 4.9 GHz, 7.2 GHz, and 9.7 GHz. The example of the gain shown in FIG. 6A has peaks around 4.7 GHz, 7.8 GHz, and 9.3 GHz. Under the influences of these high frequency peaks, distortions (ringings) are generated in the received waveforms as shown in both FIG. 5A and FIG. 6A. Although an ideal step response of the pair of the coupling elements 24 and 31 is one pulse which shape is a Gaussian pulse shape, the step response waveforms of the simulation results shown in FIG. 5B and FIG. 6B include ringing components caused by the high frequency peaks. The ringing components that appear in the received waveforms bring about increases in jitters and ISIs, which inhibits the speeding up of transmission rate (symbol rate).

Figure 7A:
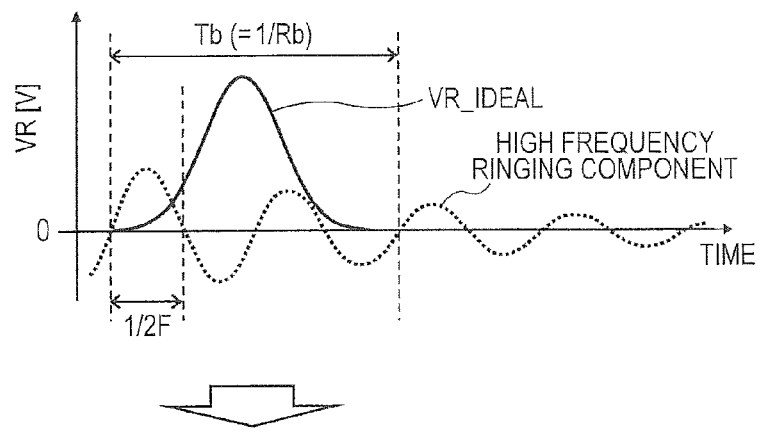
FIG. 7A and FIG. 7B are diagrams for explaining the waveform distortion of a reception signal transmitted via a non-contact coupling transmission line.
Figure 7B:
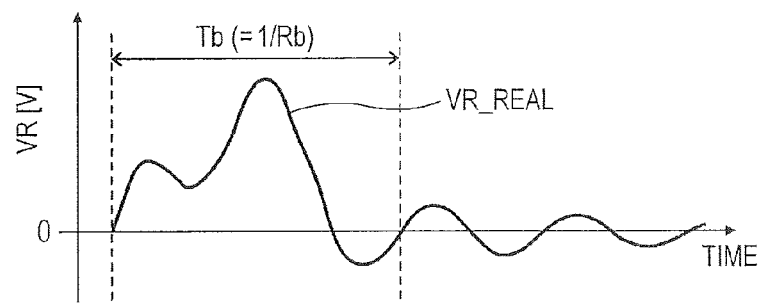

FIG. 7A and FIG. 7B are diagrams for conceptually explaining the waveform distortion of a reception signal transmitted via a non-contact coupling transmission line including a magnetic coupling. FIG. 7A is a graph showing an ideal received voltage waveform VR_IDEAL and a high frequency ringing component that is superimposed on the ideal received voltage waveform VR_IDEAL. Here, it is assumed that a transmission signal is the NRZ signal, and the symbol rate and the bit rate of the transmission signal is equal to each other. Tb in FIG. 7A shows one bit time of the transmission signal. A bit time Tb is the reciprocal number of the transmission bit rate Rb. If the current that flows through the coupling element 24 increases at the rising edge of the NRZ signal, a received voltage VR proportional to the derivative of this current can be obtained at the reception circuit 3. An ideal received voltage VR_IDEAL at the reception circuit 3 is one pulse which shape is a Gaussian pulse shape. However, a real received voltage VR_REAL has a distorted waveform as shown in FIG. 7B because of the superimposition of the high frequency ringing component.

In order to correct the ringing component shown in FIG. 7A in the transmission equalizer 20, it is all right, for example, if the relative time delay Td between two signal paths (between the variable delay circuits 21A and 21B) is set to the reciprocal number of twice the frequency F of the ringing component (½F), that is, the half period of the ringing component. With this setting, the ringing distortion that greatly causes the increase in the jitter can be corrected. Here, the frequencies F of the ringing component are the peak frequencies that appear in the voltage transfer function between the coupling elements 24 and 31. For example, in the case of FIG. 5A where the peak frequencies are 4.9 GHz, 7.2 GHz, and 9.7 GHz, the half periods of these frequencies are respectively about 102 picoseconds, 69 picoseconds, and 52 picoseconds. In this case, it is obvious that the relative time delay Td cannot coincide with the half periods of all the above peak frequencies, but it is good enough if the relative time delay Td is set to 40 picoseconds to 120 picoseconds, and it is more preferable if the relative time delay Td is set to 50 picoseconds to 100 picoseconds.

In the case where the transmission circuit 2 transmits a baseband signal, which is line coded using the NRZ code, the Biphase code, or the like, via a non-contact coupling transmission line that has the gain shown in FIG. 5A or in FIG. 6A, it is good enough if the bit rate (symbol rate) Rb of the baseband signal to be transmitted is set to a frequency lower than the lowest frequency of the frequencies of the high frequency peaks (for example, 2.5 GHz). In this case, it is good enough if the relative time delay Td of the transmission equalizer 20 is set to a time interval shorter than a half of a symbol time Tb of the baseband signal to be transmitted.

Figure 8A:
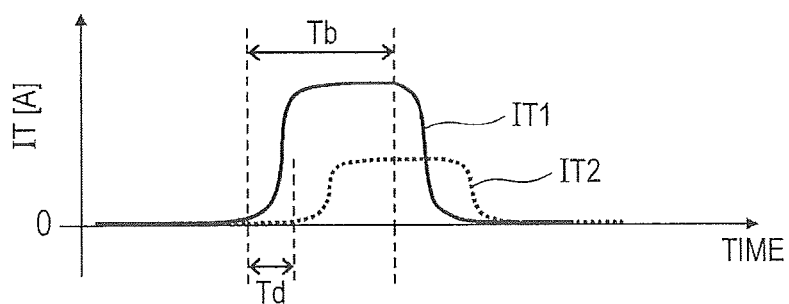
FIG. 8A, FIG. 8B, FIG. 8C, and FIG. 8D are diagrams for explaining operations of a transmission equalizer according to the first embodiment of the present invention.
Figure 8B:
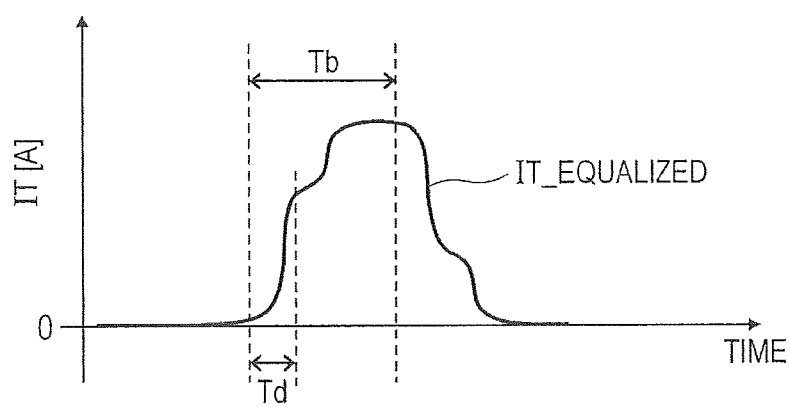

Next, an example of the operation of the transmission equalizer 20 according to this embodiment will be described with reference to FIG. 8A to FIG. 8D. FIG. 8A is a diagram separately showing driving currents IT1 and IT2 that respectively flow through the two signal paths of the transmission equalizer 20 to drive the coupling element 24. Here, the current IT1 is output from the first signal path including the variable delay circuit 21A, and the current IT2 is output from the second signal path including the variable delay circuit 21B. In FIG. 8A, the driving current IT2 is less advanced than the driving current IT1 by the relative time delay Td (that is, T1<T2). An equalized driving current IT_EQUALIZED that is supplied to the coupling element 24 on the transmission side is obtained as a result of the driving currents IT1 and IT2 being added by the adder 23. The equalized driving current IT_EQUALIZED is shown in FIG. 8B.

Figure 8C:
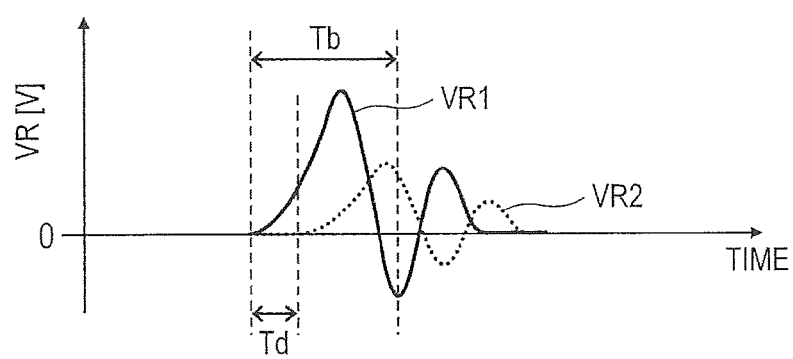

FIG. 8C is a diagram separately showing two components obtained by dissolving the reception signal obtained at the reception circuit 3. A first reception component VR1 corresponds to the driving current IT1 that flows through the first signal path of the transmission equalizer 20 shown in FIG. 8A. A second reception component VR2 corresponds to the driving current IT2 that flows through the second signal path of the transmission equalizer 20. Here, the difference between the amplitudes of the driving currents IT1 and IT2 are reflected in the difference between the amplitudes of the reception components VR1 and VR2. In addition, the difference between the phases of the driving currents IT1 and IT2 are reflected in the difference between the phases of the reception components VR1 and VR2.

Figure 8D:
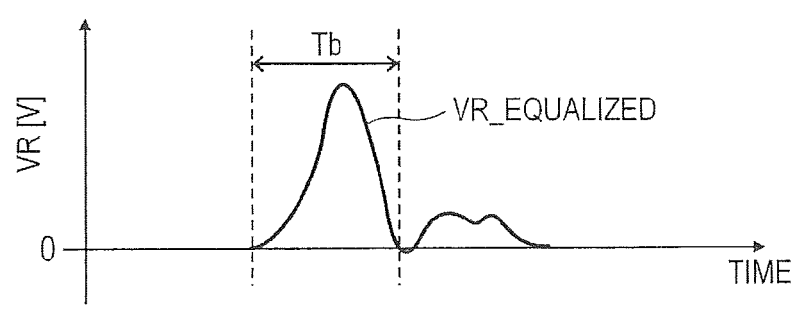

The reception circuit 3 receives the summation signal VR_EQUALIZED that is the sum of the reception components VR1 and VR2. The signal VR_EQUALIZED is shown in FIG. 8D. The two reception components VR1 and VR2 shown in FIG. 8C include ringing distortions caused by the high frequency peaks that appear in the gain of the non-contact coupling of the pair of the coupling elements 24 and 31. However, by appropriately adjusting the relative time delay between the driving currents IT1 and IT2, and the difference between the amplitudes of the driving currents IT1 and IT2 in the transmission equalizer 20, the summation signal VR_EQUALIZED which ringing distortion is corrected can be obtained as shown in FIG. 8D.

In addition, the relative time delays Td between the plural signal paths of the transmission equalizer 20 can be determined on the basis of, for example, the simulation results of the gains of the non-contact couplings of the pairs of the coupling elements 24 and 31 shown in FIG. 5A, FIG. 5B, FIG. 6A, and FIG. 6B, or on the basis of the measurement results of the gains. Alternatively, the relative time delays Td can be determined on the basis of the approximate expression of the gain peak obtained from the theoretical model of the pair of the coupling elements 24 and 31. If the coupling elements 24 and 31 are inductors, the non-contact coupling of the pair of these coupling elements can be approximately represented by a transformer model. To put it concretely, a frequency F, at which the gain peak of the non-contact coupling of the pair of the coupling elements 24 and 31 appears, is determined on the basis of self-inductances L of the coupling elements 24 and 31, a capacitor C between the coupling elements 24 and 31, and a coupling coefficient k, and can be approximately represented by Equation (1) as below. In this case, the relative time delay Td of the transmission equalizer 20 can be also set to the reciprocal number of twice the peak frequency F as shown by Equation (2).

$$F \cong \frac{k^2}{\sqrt{LC}} \quad (1)$$

$$Td \cong \frac{1}{2F} = \frac{\sqrt{LC}}{2k^2} \quad (2)$$

Alternatively, the relative time delay Td of the transmission equalizer 20 can be also determined on the basis of the measurement result of the quality of the reception signal at the reception circuit 3. The quality of the reception signal can be defined as the jitter, the BER (Bit Error Rate), the eye pattern of the reception signal, or the combination of the above items. In the transmission circuit 2 and the reception circuit 3, a training for determining the setting values including the relative time delay Td and the tap coefficients C1 and C2 may be performed. Alternatively, it is good enough if, in the transmission circuit 2 and the reception circuit 3, the setting of the transmission equalizer 20 using the quality of the reception signal received at the reception circuit 3 is appropriately adjusted.

Second Embodiment

Figure 9:
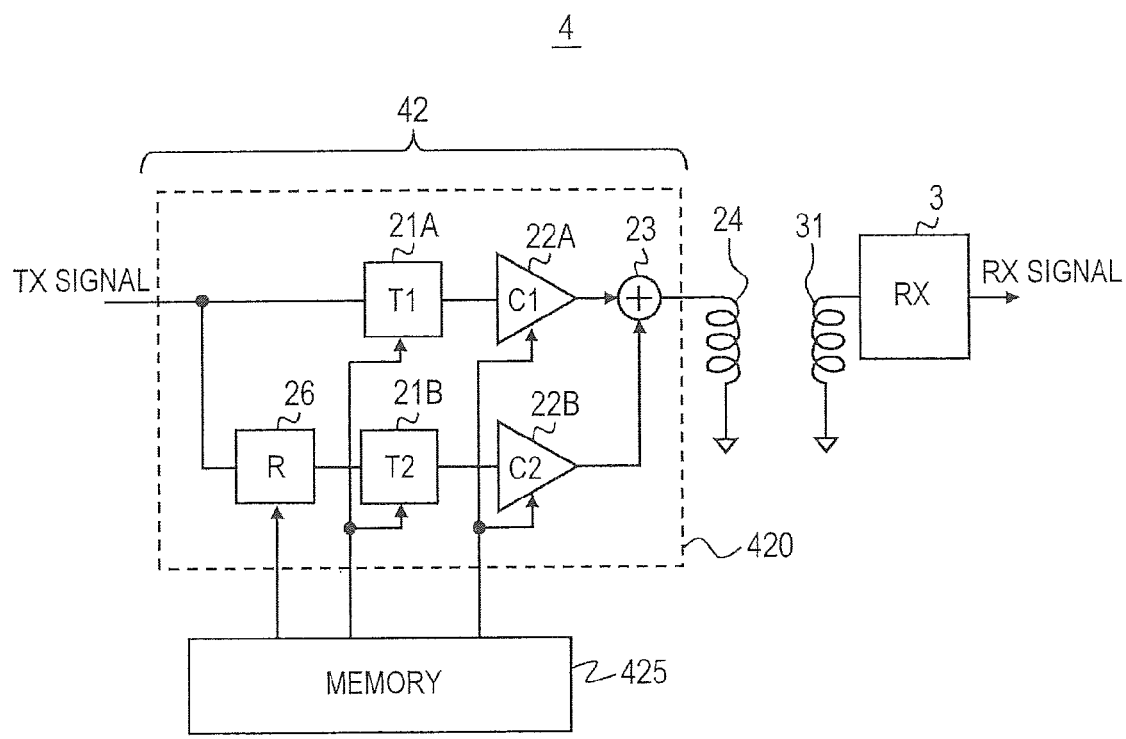
FIG. 9 is a diagram showing a configuration example of a communication system according to a second embodiment of the present invention.

In a second embodiment, a modification of the transmission equalizer 20 according to the first embodiment will be described. FIG. 9 is a block diagram showing a configuration example of a wireless communication system 4 according to the second embodiment of the present invention. A transmission circuit 42 shown in FIG. 9 includes a transmission equalizer 420 and a memory 425. The transmission equalizer 420 includes an inversion circuit 26 disposed in at least one signal path. In FIG. 9, the inversion circuit 26 is configured so that the inversion circuit 26 supplies a transmission signal as it is to a variable delay circuit 21B or inverts the polarity of the transmission signal and supplies the transmission signal to the variable delay circuit 21B. The operation of the inversion circuit 26 is determined on the basis of a control signal (polarity selection signal) supplied from the memory 425. Because the polarity of the transmission signal flowing through at least one signal path can be inverted at the transmission equalizer 420, more detailed equalizing can be performed, so that more various types of waveform distortions can be corrected.

Figure 10A:
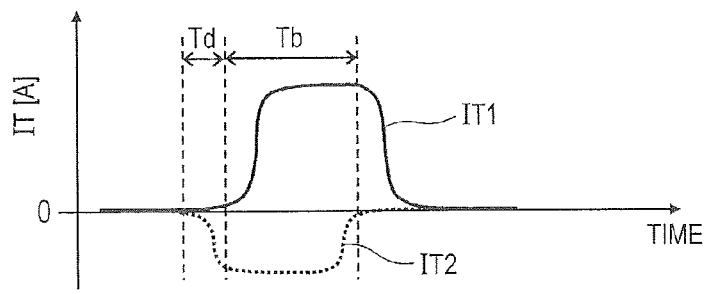
FIG. 10A, FIG. 10B, FIG. 10C, and FIG. 10D are diagrams for explaining waveform distortions of reception signals transmitted via a non-contact coupling transmission line.
Figure 10B:
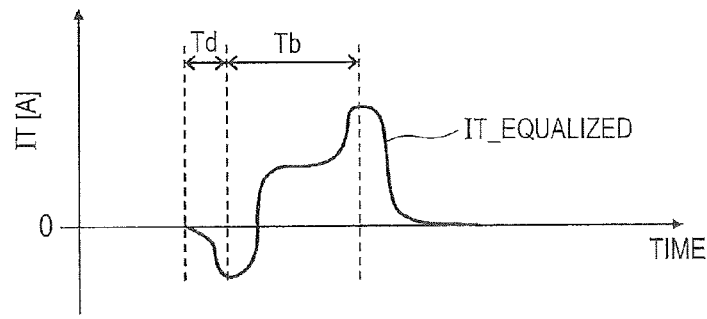

Next, an example of the operation of the transmission equalizer 420 will be described with reference to FIG. 10A to FIG. 10D. FIG. 10A is a diagram separately showing driving currents IT1 and IT2 that respectively flow through the two signal paths of the transmission equalizer 420 shown in FIG. 9. Here, the driving current IT1 is output from a first signal path including a variable delay circuit 21A, and the current IT2 is output from a second signal path including a variable delay circuit 21B. In FIG. 10A, the current IT2 is more advanced than the current IT1 by a relative time delay Td (that is, T2<T1). In addition, the polarity of the current IT2 is inverted by the inversion circuit 26. An equalized driving current IT_EQUALIZED that is supplied to a coupling element 24 on the transmission side is obtained as a result of the driving currents IT1 and IT2 being added by an adder 23. The equalized driving current IT_EQUALIZED is shown in FIG. 10B.

Figure 10C:
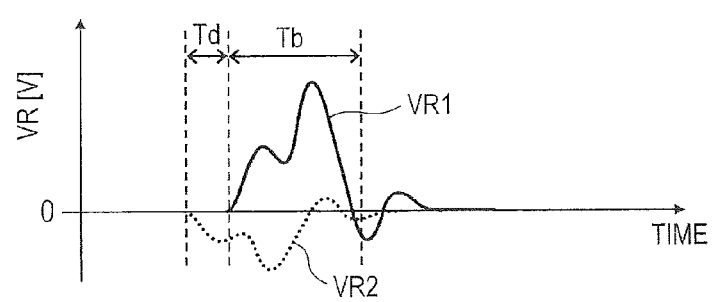

FIG. 10C is a diagram separately showing two components obtained by dissolving a reception signal obtained at a reception circuit 3. A first reception component VR1 corresponds to the driving current IT1 that flows through the first signal path of the transmission equalizer 420 shown in FIG. 10A. A second reception component VR2 corresponds to the driving current IT2 that flows through the second signal path of the transmission equalizer 420. Here, the polarity inversion operation performed by the inversion circuit 26 is reflected in the polarity of the reception component VR2.

Figure 10D:
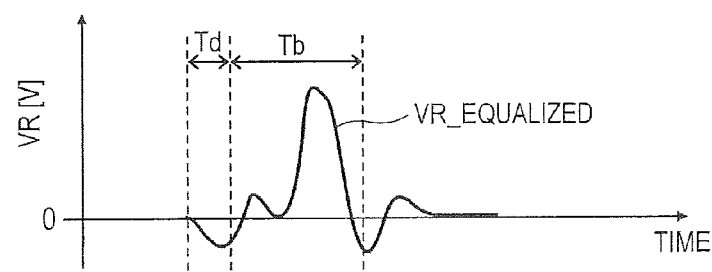

The reception circuit 3 receives the summation signal VR_EQUALIZED that is the sum of the reception components VR1 and VR2. The signal VR_EQUALIZED is shown in FIG. 10D. The two reception components VR1 and VR2 shown in FIG. 10C respectively includes ringing distortions caused by the high frequency peaks that appear in the gain of the non-contact coupling of a pair of the coupling elements 24 and 31. However, by appropriately adjusting the relative time delay between the driving currents IT1 and IT2, the difference between the amplitudes of the driving currents IT1 and IT2, and the polarity of the reception component VR2 in the transmission equalizer 420, the summation signal VR_EQUALIZED which ringing distortion is corrected can be obtained as shown in FIG. 10D.

Here, the inversion circuit 26 can be disposed either between the delay circuit 21B and an amplifier 22B or in the rear of the amplifier 22B. In addition, the polarity inversion operation performed by the inversion circuit 26 is equivalent to the operation of multiplying the transmission signal by a negative tap coefficient performed at the amplifier (coefficient multiplier) 22B. Therefore, it is also conceivable that the function of polarity inversion is performed at the amplifier 22B.

Third Embodiment

Figure 11:
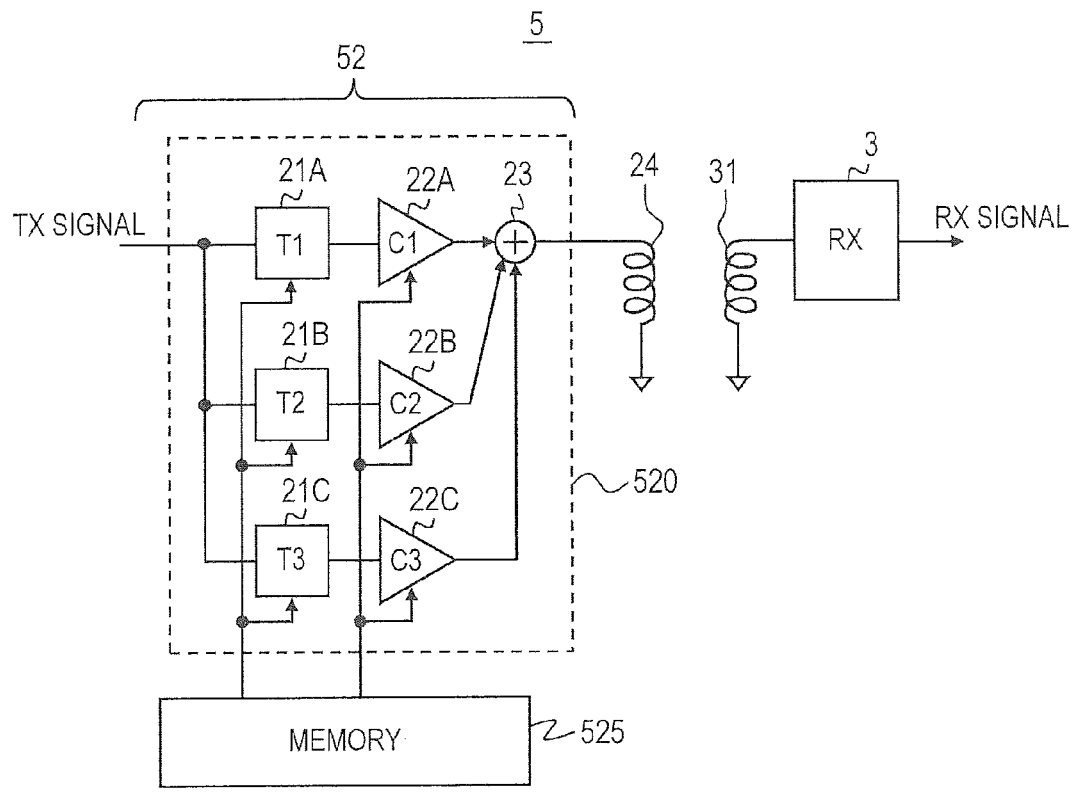
FIG. 11 is a diagram showing a configuration example of a communication system according to a third embodiment of the present invention.

In a third embodiment, a modification of the transmission equalizer 20 according to the first embodiment will be described. FIG. 11 is a block diagram showing a configuration example of a wireless communication system 5 according to the third embodiment of the present invention. A transmission circuit 52 shown in FIG. 11 includes a transmission equalizer 520 and a memory 525. The transmission equalizer 520 creates three equivalent transmission signals by branching an incoming transmission signal. The transmission equalizer 520 further includes three signal paths with which the transmission equalizer 520 can respectively give time delays different from each other to the three equivalent transmission signals. In other words, the transmission equalizer 520 includes a third signal path having a variable delay circuit 21C and an amplifier (coefficient multiplier) 22C as well as the two signal paths shown in FIG. 2. After being added at an adder 23, three outputs from the signal paths are supplied to a coupling element 24 as an equalized transmission signal. The memory 525 supplies control signals (for example, setting values) used for setting the values of time delays T1, T2, and T3, the values of tap coefficients C1, C2, and C3 to variable delay circuits 21A, 21B, and 21C, and to amplifiers 22A, 22B, and 22C.

Depending on the gain characteristic of the non-contact coupling of a pair of coupling elements 24 and 31, there is a possibility that the distortion of a reception waveform cannot be fully corrected by only adding two signals which phases are different from each other. In the transmission equalizer 520, because three signals which phases are different from each other can be added, the distortion of the reception waveform can be effectively corrected. As shown in FIG. 5A or in FIG. 6A, there is a special case where the gain characteristic of the non-contact coupling of a pair of coupling elements 24 and has plural high frequency peaks. According to this embodiment, plural ringing distortions, which are caused by plural high frequency peaks and have frequencies different from each other, can be effectively corrected.

For example, the relative time delay Td2 (Td2=|T2−T1|) can be set to the reciprocal number of twice a first peak frequency, and the relative time delay Td3 (Td3=|T3−T1|) can be set to the reciprocal number of twice a second peak frequency. Owing to the above settings, two ringing distortions, which are caused by the two high frequency peaks and have frequencies different from each other, can be easily corrected. In addition, in this case, it is not always necessary that there is an integral multiple relation between the value of the relative time delay Td2 and that of the relative time delay Td3. In other words, in the transmission equalizer 520, the sampling time intervals of the transmission signal used by the three variable delay circuits 21A, 21B, and 21C can be set to unequal intervals respectively. In the case of an FIR filter type equalizer for wire transmission, it is commonly used to sample a transmission signal with time intervals between which values there are integral multiple relations. However, if a distortion is caused by plural peaks which frequencies have no integral multiple relations with each other as shown in FIG. 5A and in FIG. 6A, it is difficult for the distortion to be fully corrected by an equalizer with such a configuration as above. In contrast, because the transmission equalizer 520 can sample a transmission signal with time intervals between which values there are no integral multiple relations in three or more variable delay circuits 21, the distortion that is caused by plural peaks which frequencies have no integral multiple relations with each other can be corrected.

In addition, in a similar way as described in the first embodiment, it is also all right if the transmission equalizer 520 is configured so that time delays given to transmission signals in some of the plural signal paths can be changed, and time delays given to transmission signals in the other signal paths are set to fixed values by fixed delay circuits. In addition, it is good enough if one of the plural signal paths includes no delay circuit, and gives a zero time delay to the corresponding transmission signal.

In addition, the configuration of the transmission equalizer 520 according to this embodiment can be changed to include four or more signal paths. It is also conceivable that the transmission equalizer 520 includes an inversion circuit 26 described in the second embodiment in at least one signal path.

Fourth Embodiment

Figure 12:
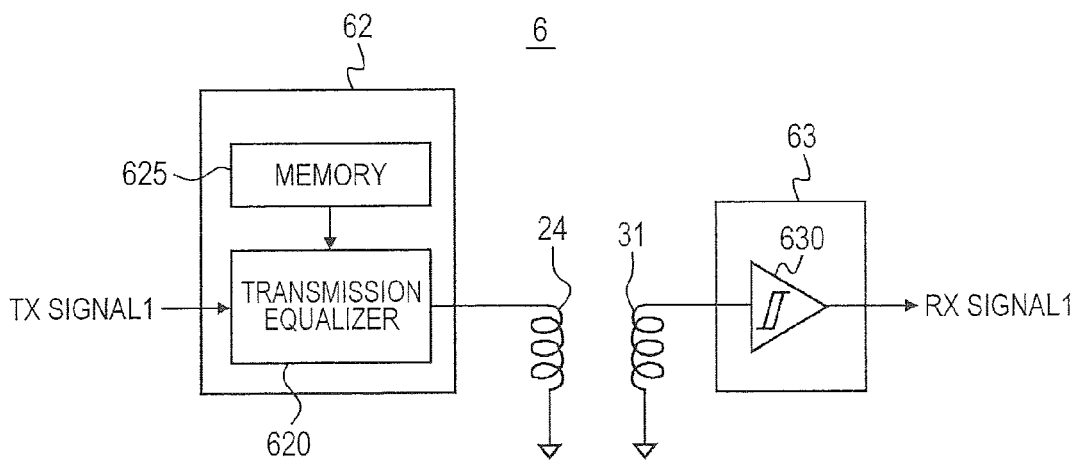
FIG. 12 is a diagram showing a configuration example of a communication system according to a fourth embodiment of the present invention.

In a fourth embodiment, a concrete example of wireless communication system according to the first to third embodiments will be described. FIG. 12 is a block diagram showing a configuration example of a communication system 6 according to this embodiment of the present invention. As is clear from the comparison of FIG. 12 with FIG. 2, FIG. 9, and FIG. 11, a reception circuit 63 shown in FIG. 12 is different from other reception circuits in that the reception circuit 63 includes a hysteresis buffer 630. The hysteresis buffer 630 compares a reception signal VR_EQUALIZED, which is received via a coupling element 31, with a threshold VTH for code judgment (bit judgment), and outputs the comparison result. The output of the hysteresis buffer 630 shows a retrieved reception data (RX SIGNAL1).

A transmission circuit 62 shown in FIG. 12 includes a transmission equalizer 620 and a memory 625. The configuration and operation of the transmission equalizer 620 can be made equal to those of the transmission equalizers 20, 420, or 520 respectively described in the first to third embodiments. The configuration and operation of the memory 625 can be made equal to those of the memory 25, 425, or 525 respectively described in the first to third embodiments.

Figure 13A:
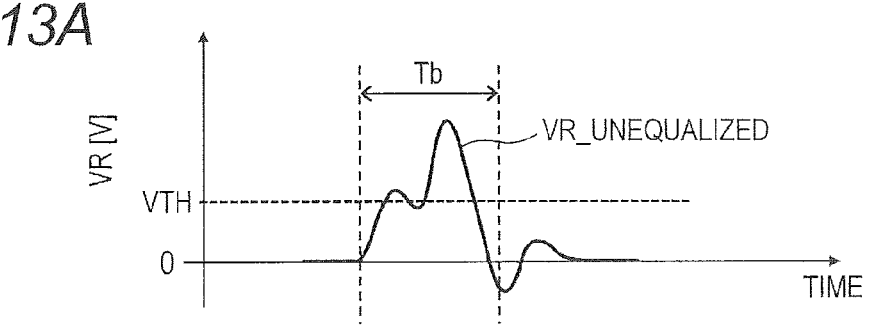
FIG. 13A and FIG. 13B are diagrams showing waveforms of reception signals transmitted via a non-contact coupling transmission line.

Next, the advantages of performing transmission equalizing in a system according to this embodiment in which the hysteresis buffer 630 is used as a reception circuit will be described in the case where the transmission equalizing similar to that performed in the first, second, or third embodiment is performed. As described above, if the transmission equalizing is not performed, a reception signal VR_UNEQUALIZED received via the coupling element 31 includes a ringing distortion. As shown in FIG. 13A, if the ringing distortion included in the rising edge of the reception signal VR_UNEQUALIZED causes intersymbol interference, the timing at which the rising edge of the reception signal VR_UNEQUALIZED crosses the threshold VTH of the hysteresis buffer 630 becomes dependent on the data pattern of the reception signal, which leads to increase in a data-dependent jitter.

Figure 13B:
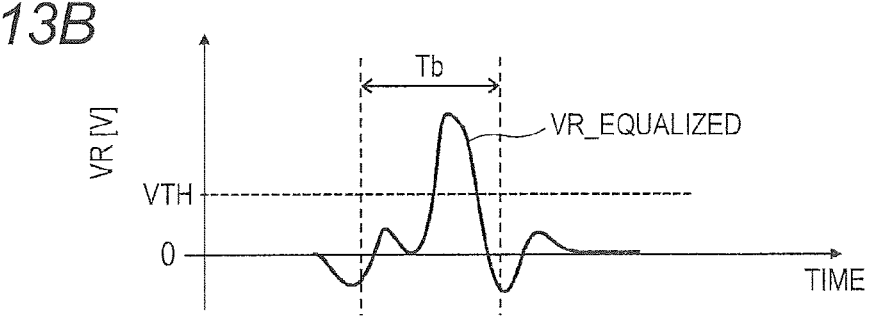

In contrast, the transmission equalizer 620 according to this embodiment can reshape the waveform of a transmission signal on the basis of, for example, the transmission equalizing described with reference to FIG. 10A to FIG. 10D. As a result, as shown in FIG. 13B, the transmission equalizer 620 can correct the ringing distortion generated at the rising edge that crosses the threshold VTH, which leads to the suppression of the intersymbol interference. Because the intersymbol interference is suppressed, the timing at which the rising edge of the reception signal VR_EQUALIZED crosses the threshold VTH becomes constant, which leads to suppression of a data-dependent jitter.

Fifth Embodiment

In a fifth embodiment, a modification of a wireless communication system according to the first to forth embodiments will be described. FIG. 14 is a block diagram showing a configuration example of a wireless communication system 7 according to this embodiment of the present invention. A transmission circuit 72 includes a transmission equalizer 720 and a memory 725. In addition, the wireless communication system 7 includes a control mechanism that determines setting values for the time delays and tap coefficients of the transmission equalizer 720 on the basis of a measurement result (for example, a jitter measurement result) of the reception quality at a reception circuit 73, and applies these setting values to the transmission equalizer 720. In an example shown in FIG. 14, this control mechanism includes a jitter measurement circuit 731 and a control circuit 732 disposed in the reception circuit 73.

The jitter measurement circuit 731 measures the jitter of reception data (RX SIGNAL) obtained at a hysteresis buffer 730, and supplies the measurement result to the control circuit 732. The control circuit 732 generates the setting values for the transmission equalizer 720 on the basis of the jitter measurement result, and supplies these setting values to the transmission equalizer 720. In addition, the control circuit 732 can also determine a threshold for code judgment (bit judgment) applied to the hysteresis buffer 730 on the basis of the jitter measurement result. In the above case, the control circuit 732 supplies a control signal for threshold setting to the hysteresis buffer 730.

In the example shown in FIG. 14, a second non-contact coupling transmission line of a pair of coupling elements 27 and 32 is used in order for the reception circuit 73 to feed the equalizer setting values back to the transmission circuit 72. In other words, a second transmission circuit 74 receives the equalizer setting values, and sends the equalizer setting values to a second reception circuit 75 via the non-contact coupling of the pair of the coupling elements 27 and 32. The second reception circuit 75 stores the equalizer setting values in the memory 725. In this case, it is conceivable that the second non-contact coupling transmission line is designed so that it performs data transmission more steadily than a first non-contact coupling transmission line of a pair of coupling elements 24 and 31 does. For example, the second non-contact coupling transmission line can have a transmission distance longer than that the first non-contact coupling transmission line has by making the size of the pair of the coupling elements 27 and 32 larger. In addition, it is conceivable that the transmission speed (bit rate) of the second non-contact coupling transmission line is set lower than that of the first non-contact coupling transmission line.

Figure 16:
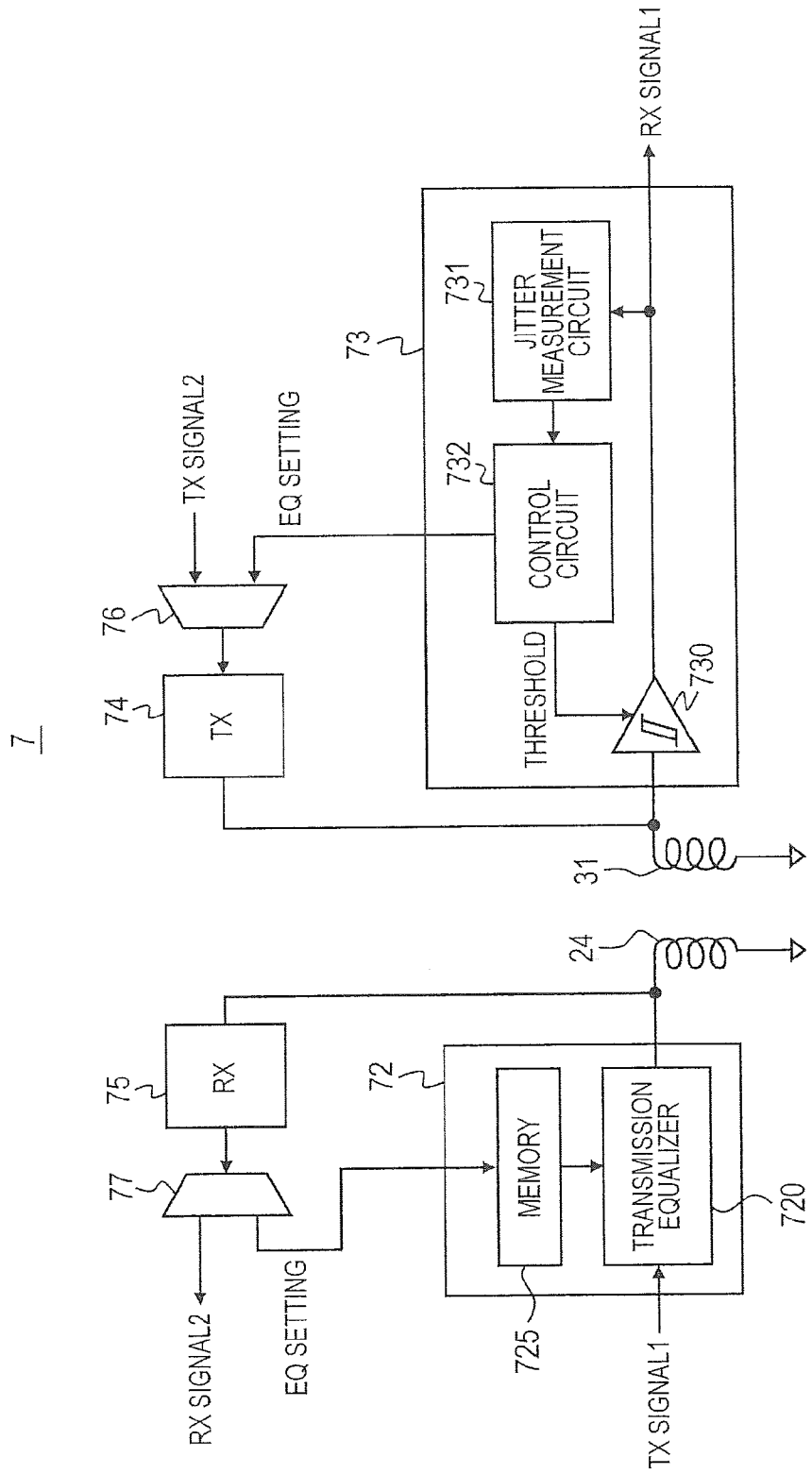
FIG. 16 is a diagram showing another configuration example of the communication system according to the fifth embodiment of the present invention.

In addition, the feeding the equalizer setting values back from the reception circuit 73 to the transmission circuit 72 can be performed via any other route. For example, as shown in FIG. 16, a two-way communication can be performed via only the pair of the coupling elements 24 and 31 in the wireless communication system 7. Alternatively, it is conceivable that the feeding the equalizer setting values back from the reception circuit 73 to the transmission circuit 72 is performed via a wire transmission using a cable. In this case, it is conceivable that the cable is coupled between the transmission circuit 74 and the reception circuit 75 in order to execute a training sequence for determining the setting values for the transmission equalizer 720, and the cable is removed after the training sequence is finished.

Figure 15:
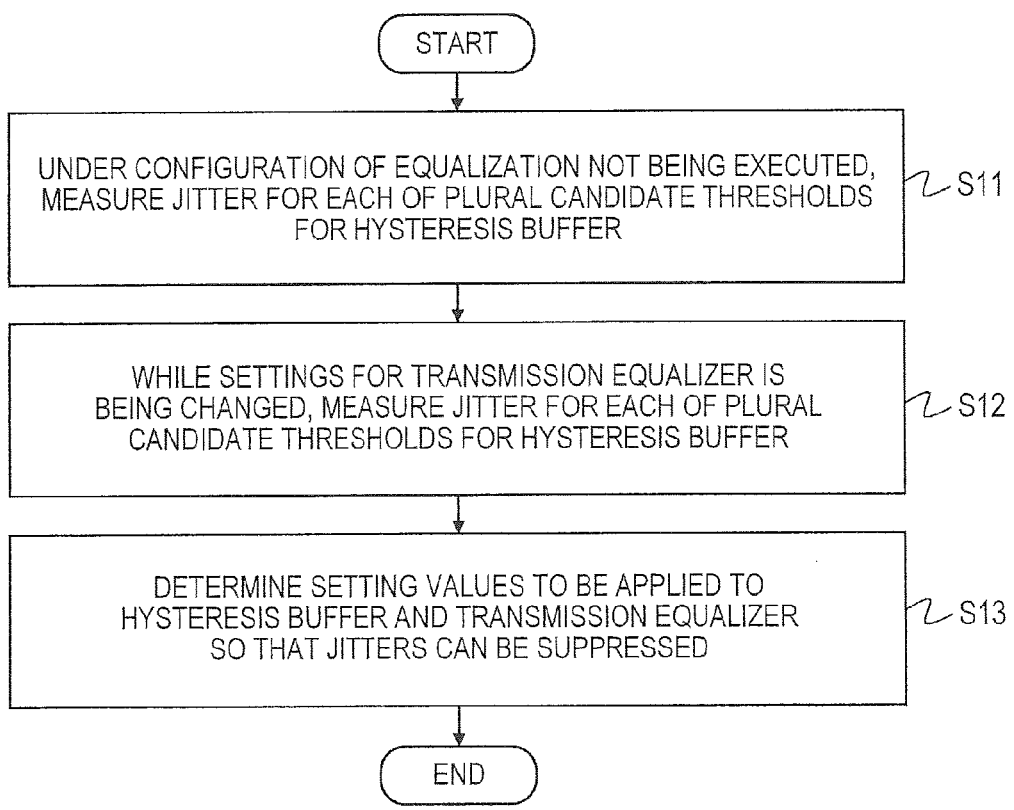
FIG. 15 is a flowchart showing a training procedure according to the fifth embodiment of the present invention.

Next, a concrete example of the training sequence for determining the setting values for the transmission equalizer 720 and the threshold of the hysteresis buffer 730 will be described. FIG. 15 is a flowchart showing an example of the training sequence. The transmission equalizer 720 is configured to stop the equalization at step S11. Subsequently, the control circuit 732 measures a jitter for each of plural candidate thresholds of the hysteresis buffer 730. The stoppage of the equalization performed by the transmission equalizer 720 can be achieved by setting a tap coefficient of only one signal path to 1 and setting the coefficients of other signal paths to zero. At step S11, the control circuit 732 obtains the relations between the candidate thresholds of the hysteresis buffer 730 and the amounts of jitters. The relations between the candidate thresholds of the hysteresis buffer 730 and the amounts of jitters at the time when the equalization is stopped are used as "references".

At step S12, while the settings for the transmission equalizer 720 are being changed, a jitter is measured for each of the plural candidate thresholds of the hysteresis buffer 730. As a result, the control circuit 732 obtains the relations between the equalizer settings, the settings of the candidate thresholds of the hysteresis buffer 730, and the amounts of the jitters. Here, the equalizer settings include the relative time delays Td (or the time delays given by the signal paths) and the tap coefficients. In other words, at step S12, such a fine-comb training can be performed using all the candidate setting values of the equalizer and all the values of the candidate thresholds of the hysteresis buffer 730.

At step S13, the control circuit 732 determines the setting values to be applied to the hysteresis buffer 730 and the transmission equalizer 720 (a threshold and equalizer setting values) so that the jitters can be suppressed. For example, the control circuit 732 calculates the total sums of jitter reduction amounts for the candidate setting values of the equalizer in comparison with references within a certain range of candidate thresholds (for example, within 10 mV to 20 mV) of the hysteresis buffer 730. After the above calculation, the control circuit 732 can determine a candidate setting value of the equalizer that provides the largest total sum of jitter reduction amounts as a setting value to be applied to the transmission equalizer 720. In addition, the control circuit 732 can determine a candidate threshold that provides the minimum jitter or the median value of values that provide jitters equal to or lower than a predefined value (for example, equal to or lower than 50 picoseconds) as a setting value to be applied to the hysteresis buffer 730.

After the training sequence is completed, the wireless communication system 7 can transfer to the normal operation state in which arbitrary data transmission is performed between the transmission circuit 72 and the reception circuit 73. To put it concretely, in the normal operation of the wireless communication system 7 after the training sequence, the second transmission circuit 74 transmits and the second reception circuit 75 receives arbitrary data. In other words, the second transmission circuit 74 transmits a first transmission data signal (TX SIGNAL2) and the second reception circuit 75 receives a second reception data signal (RX SIGNAL2). In this case, an input selection circuit 76 is switched so that the second transmission data signal (TX SIGNAL2) is input into the second transmission circuit 74, and an output selection circuit 77 is switched so that the second reception data signal (RX SIGNAL2) is output from the reception circuit 75 to the outside. In the normal operation of the wireless communication system 7, it is also conceivable that the reception circuit 73 controls the threshold of the hysteresis buffer 730. For example, the control circuit 732 can lower the threshold of the hysteresis buffer 730 for bit judgment in accordance with the reduction in the amplitude of the reception signal received from the transmission circuit 72, the increase in the jitter, or the increase in the bit error rate.

It is conceivable that, in accordance with the gain or the usage condition of the pair of the coupling elements 24 and 31, the gain of the pair of the coupling elements 24 and 31 changes. In addition, because the plural gain peaks and other gain characteristic bring about a distortion in the reception quality, if the relative time delays are determined only on the basis of the gain peaks, it is not always possible to make the reception quality optimal. According to this embodiment, because the transmission equalizer 720 is configured using the measurement results of the reception circuit 73, the transmission equalizer 720 can be configured so that the reception quality of the reception circuit 73 is optimized.

In addition, some or all the functions of the control circuit 732 described in this embodiment can be entrusted to the transmission circuit 72. In this case, it is necessary for data showing the jitter measurement result to be fed back from the reception circuit 73 to the transmission circuit 72.

In addition, the settings for the transmission equalizer 720 and the hysteresis buffer 730 can be performed on the basis of measurement results other than the jitter measurement result. For example, it is good enough if the reception circuit 73 measures one of reception qualities (for example, the bit error rate) that is affected by the jitter or ISI.

The functions of the control circuit 732 described in this embodiment can be materialized by a semiconductor device including an ASIC (Application Specific Integrated Circuit). Alternatively, these functions can be materialized by making a microcomputer system including at least one processor (e.g. a microprocessor, an MPU, or a DSP (Digital Signal Processor)) execute a program. To put it concretely, the functions of the control circuit 732 can be materialized as follows. First, an algorithm for the configurations of the transmission equalizer 720 and the hysteresis buffer 730 is devised, where the configurations have been already described so far with reference to the flowchart and the like. Next, one or plural programs including an instruction group that makes the computer system execute the above algorithm is designed, and the one or plural programs are provided to the computer system.

The one or plural programs can be stored in various types of non-transitory computer readable media, and can be provided to the computer system. The non-transitory computer readable media includes various types of tangible storage media. Several examples of the non-transitory computer readable media includes magnetic recording media (for example, a flexible disk, a magnetic tape, and a hard disk drive), magneto optical recording media (for example, a magneto optical disk), a CD-ROM (Read Only Memory), a CD-R, a CD-R/W, semiconductor memories (for example, a mask ROM, a PROM (Programmable ROM)), an EPROM (Erasable PROM)), a flash ROM, and a RAM (Random Access Memory). Alternatively, the one or plural programs can be provided to the computer system via various transitory computer readable media. Examples of the transitory computer readable media include an electric signal, an optical signal, and an electromagnetic wave. The transitory computer readable media can provide the one or plural programs to the computer system via wire transmission lines such as a wire and an optical fiber, or via wireless transmission lines.

Sixth Embodiment

The wireless communication systems according to the first, second, third, fourth, and fifth embodiment have been described so far under the assumption that their circuit configurations employ a single-ended signal transmission method. However, the wireless communication systems 1, 4, 5, 6, and 7 according to the first to fifth embodiments can be configured to transmit a differential mode signal. For example, in the configuration example according to the first embodiment shown in FIG. 2, in order to transmit the differential mode signal, it is conceivable that the modes of inputs/outputs of the delay circuits 21A and 21B, and the modes of inputs/outputs of the amplifiers 22A and 22B are changed into differential modes, and that the mode of the connection between the transmission circuit 2 and the coupling element 24, and the mode of the connection between the reception circuit 3 and the coupling element 31 are changed into differential modes. The control signals that are supplied to the transmission equalizer 20 by the memory 25 can remain to be the single-ended signals because the control signals are not high-speed data.

Figure 17:
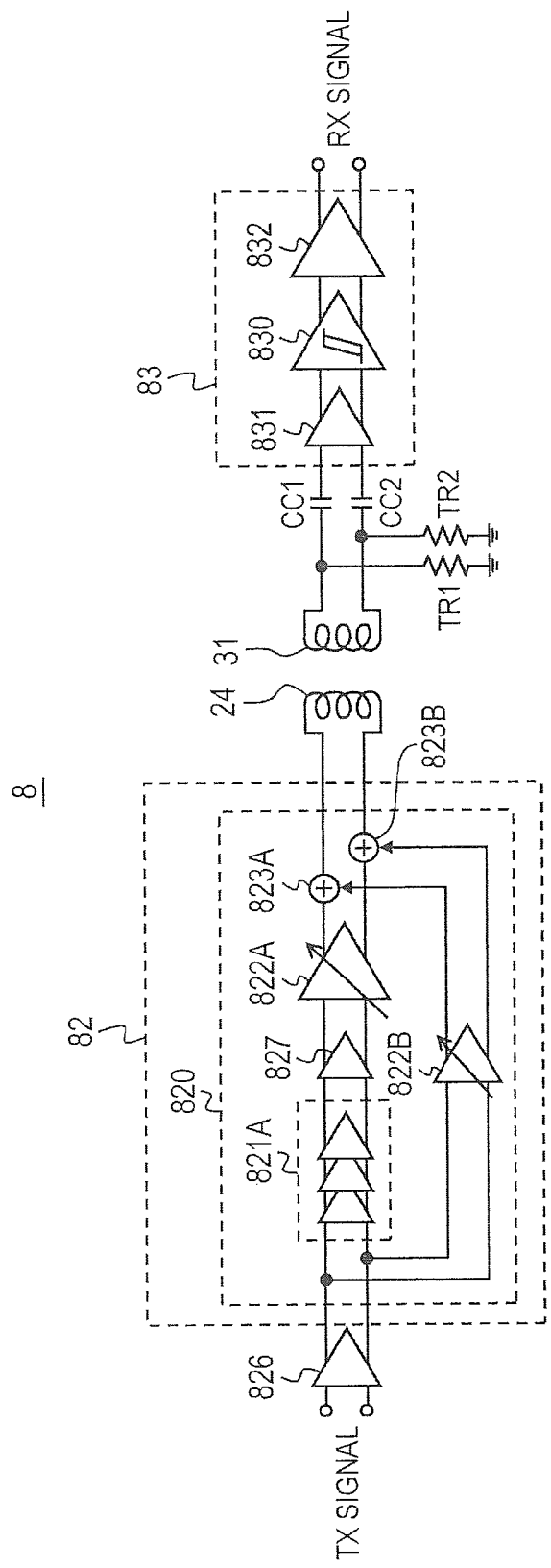
FIG. 17 is a diagram showing a configuration example of a communication system according to a sixth embodiment of the present invention.

FIG. 17 is a block diagram showing a configuration example of a wireless communication system 8 modified to transmit a differential mode signal. The wireless communication system 8 includes a transmission circuit 82 and a reception circuit 83. The transmission circuit 82 includes a transmission equalizer 820. In the example shown in FIG. 17, a transmission signal (TX SIGNAL) is supplied to the transmission equalizer 820 via a differential buffer 826. The transmission equalizer 820 shown in FIG. 17 includes a variable delay circuit 821A, variable gain differential amplifiers 822A and 822B, adders 823A and 823B, and a buffer 827. The variable delay circuit 821A corresponds to the variable delay circuit 21A in the single-ended configuration shown in FIG. 2. In the configuration example shown in FIG. 17, a variable delay circuit corresponding to the variable delay circuit 21B shown in FIG. 2 is omitted. The variable gain differential amplifiers 822A and 822B respectively correspond to the amplifiers 22A and 22B in the single-ended configuration shown in FIG. 2. The adders 823A and 823B correspond to the adder 23 in the single-ended configuration shown in FIG. 2.

Figure 18:
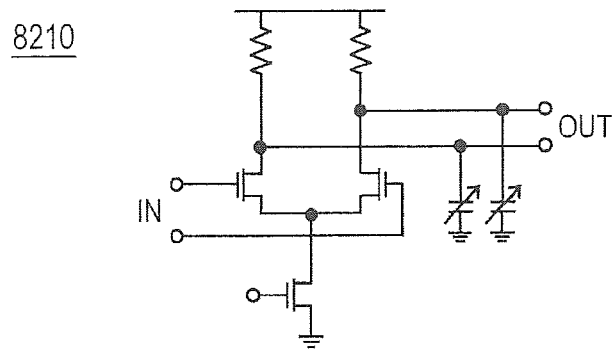
FIG. 18 is a diagram showing a configuration example of a delay cell according to the sixth embodiment of the present invention.
Figure 19:
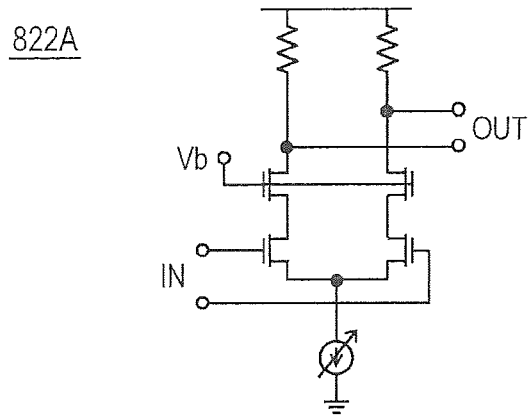
FIG. 19 is a diagram showing a configuration example of a variable gain differential amplifier according to the sixth embodiment of the present invention.

The variable delay circuit 821A includes, for example, plural delay cells 8210. As shown in FIG. 18, each of the delay cells 8210 can be configured with, for example, a differential amplifier and variable capacitors connected to the differential output of the differential amplifier. 18. In addition, the variable gain differential amplifiers 822A and 822B can be configured with, for example, cascode CML (Current Mode Logic) circuits as shown in FIG. 19.

Figure 20:
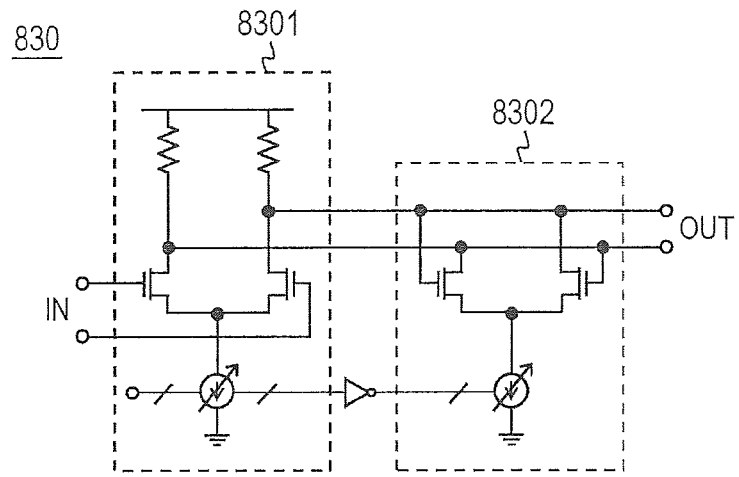
FIG. 20 is a diagram showing a configuration example of a hysteresis buffer according to the sixth embodiment of the present invention.

In the example shown in FIG. 17, the coupling element 31 and the reception circuit 83 are coupled to each other via AC coupling capacitors CC1 and CC2. Resistors TR1 and TR2 connected to a pair of signal lines between the coupling element 31 and the reception circuit 83 form a shunt terminal circuit for impedance matching. The reception circuit shown in FIG. 17 includes a hysteresis buffer 830 and differential buffers 831 and 832. As shown in FIG. 20, the hysteresis buffer 830 can be configured to include, for example, a differential amplifier stage 8301 and a variable hysteresis stage 8302 coupled to the differential amplifier stage 8301. The hysteresis buffer 830 converts a pulse signal received by the coupling element 31 into an NRZ signal.

Other Embodiment

The above described embodiments can be accordingly combined to bring about another embodiment.

In addition, the above described embodiments of the present invention are only examples to which the technological idea devised by the inventors of the present invention is applied. In other words, the technological idea of the present invention is not to be restricted only to the above-described embodiments, and it is to be understood that various modifications naturally fall within the technological idea of the present invention.

What is claimed is:

1. A transmission apparatus comprising a transmission equalizer that equalizes a transmission signal transmitted in a signal transmission performed via a non-contact coupling including a magnetic coupling of a pair of coupling elements,
wherein the transmission equalizer creates a plurality of equivalent transmission signals by branching the transmission signal; and
includes
a plurality of signal paths that respectively give time delays different from each other to the equivalent transmission signals, and respectively multiplies the delayed transmission signals by tap coefficients, and
an output path that provides a filter output based on the total sum of outputs of the signal paths to one coupling element of the pair of the coupling elements,
wherein at least one of the plurality of signal paths includes a variable delay circuit that can change a time delay to be given to the corresponding transmission signal.

2. The transmission apparatus according to claim 1, wherein a relative time delay between at least one pair of signal paths is set to a time interval shorter than a half of a symbol time of the transmission signal.

3. The transmission apparatus according to claim 1, wherein a relative time delay between at least one pair of signal paths is set to a time interval that is shorter than one symbol time of the transmission signal and not equal to one nth of the one symbol time (wherein n is a positive integer).

4. The transmission apparatus according to claim 1, wherein a relative time delay between at least one pair of signal paths is set to a reciprocal number of twice a peak frequency that appears in a voltage transfer function of the non-contact coupling.

5. The transmission apparatus according to claim 1, wherein a relative time delay between at least one pair of signal paths is determined on the basis of a peak that appears in a voltage transfer function of the non-contact coupling.

6. The transmission apparatus according to claim 1, wherein a relative time delay between at least one pair of signal paths is 40 picoseconds to 120 picoseconds.

7. The transmission apparatus according to claim 1,
wherein the signal paths include a first to a third signal paths, and
there is no integral multiple relation between a value of a first relative time delay and a value of a second relative time delay, wherein the first relative time delay is a relative time delay between the first and the second signal paths and the second relative time delay is a relative time delay between the first and the third signal paths.

8. The transmission apparatus according to claim 7, wherein the first relative time delay and the second relative time delay are determined on the basis of a first peak and a second peak that appear in a voltage transfer function of the non-contact coupling.

9. The transmission apparatus according to claim 1, wherein the variable delay circuit includes an amplifier circuit and a variable capacitor circuit that shunt couples the output of the amplifier circuit.

10. The transmission apparatus according to claim 1, further comprising a memory circuit that supplies setting values about the time delays and the tap coefficients to the signal paths.

11. The transmission apparatus according to claim 1, further comprising a control circuit that determines setting values about the time delays and the tap coefficients on the basis of a measurement result of a jitter of a reception signal received via the pair of the coupling elements by a reception apparatus.

12. The transmission apparatus according to claim 1, wherein the pair of the coupling elements are a pair of inductors.

13. The transmission apparatus according to claim 1, wherein the signal transmission is a baseband signal transmission and the transmission signal is a baseband signal encoded by a line code.

14. A communication system comprising:
the transmission apparatus according to claim 1;
a reception apparatus that receives a signal transmitted from the transmission apparatus via the non-contact coupling of the pair of the coupling elements; and
a control mechanism that determines setting values about the time delays and the tap coefficients on the basis of a measurement result of a jitter of the reception signal received by the reception apparatus, and applies the setting values to the transmission equalizer.

15. A communication system comprising:
the transmission apparatus according to claim 1; and
a reception apparatus including a hysteresis buffer that generates an output signal showing a result obtained by comparing a reception signal transmitted from the transmission apparatus via the non-contact coupling of the pair of the coupling elements with a threshold for bit judgment.

16. A transmission apparatus comprising a transmission equalizer that equalizes a transmission signal transmitted in a signal transmission performed via a non-contact coupling including a magnetic coupling of a pair of coupling elements,
wherein the transmission equalizer creates a plurality of equivalent transmission signals by branching the transmission signal; and
includes
a plurality of signal paths that respectively give time delays different from each other to the equivalent transmission signals, and respectively multiplies the delayed transmission signals by tap coefficients, and
an output path that provides a filter output based on the total sum of outputs of the signal paths to one coupling element of the pair of the coupling elements,
wherein a relative time delay between at least one pair of signal paths is set to a time interval shorter than a half of a symbol time of the transmission signal.

17. The transmission apparatus according to claim 16, wherein the relative time delay between the at least one pair of signal paths is set to a time interval not equal to one nth of a symbol time (wherein n is a positive integer).

18. The transmission apparatus according to claim 16, wherein the relative time delay between at least one pair of signal paths is set to a reciprocal number of twice a peak frequency that appears in a voltage transfer function of the non-contact coupling.

19. A transmission apparatus comprising a transmission equalizer that equalizes a transmission signal transmitted in a signal transmission performed via a non-contact coupling including a magnetic coupling of a pair of coupling elements,
wherein the transmission equalizer creates a plurality of equivalent transmission signals by branching the transmission signal; and
includes
a plurality of signal paths that respectively give time delays different from each other to the equivalent transmission signals, and respectively multiplies the delayed transmission signals by tap coefficients, and
and an output path that provides a filter output based on the total sum of outputs of the signal paths to one coupling element of the pair of the coupling elements,
wherein the relative time delay between at least one pair of signal paths is set to a reciprocal number of twice a peak frequency that appears in a voltage transfer function of the non-contact coupling.

20. The transmission apparatus according to claim 19, wherein the relative time delay between at least one pair of signal paths is set to a time interval that is shorter than one symbol time of the transmission signal and not equal to one nth of the one symbol time (wherein n is a positive integer).

* * * * *